(12) United States Patent
Steiner et al.

(10) Patent No.: US 11,726,910 B2
(45) Date of Patent: Aug. 15, 2023

(54) DYNAMIC CONTROL OF MEMORY BANDWIDTH ALLOCATION FOR A PROCESSOR

(71) Applicant: Intel Corporation, Santa Clara, CA (US)

(72) Inventors: Ian M. Steiner, Portland, OR (US); Andrew J. Herdrich, Hillsboro, OR (US); Wenhui Shu, Shanghai (CN); Ripan Das, Beaverton, OR (US); Dianjun Sun, Shanghai (CN); Nikhil Gupta, Portland, OR (US); Shruthi Venugopal, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 16/816,779

(22) Filed: Mar. 12, 2020

(65) Prior Publication Data

US 2020/0210332 A1    Jul. 2, 2020

Related U.S. Application Data

(60) Provisional application No. 62/817,927, filed on Mar. 13, 2019.

(51) Int. Cl.
*G06F 12/06* (2006.01)
*G06F 11/34* (2006.01)
*G06F 11/30* (2006.01)

(52) U.S. Cl.
CPC ...... *G06F 12/0646* (2013.01); *G06F 11/3037* (2013.01); *G06F 11/3495* (2013.01); *G06F 2212/1044* (2013.01)

(58) Field of Classification Search
CPC ............. G06F 12/0646; G06F 11/3037; G06F 11/3003; G06F 2212/1044; G06F 11/3419; G06F 11/3442; G06F 11/3452
See application file for complete search history.

(56) References Cited

U.S. PATENT DOCUMENTS

| 6,556,952 B1* | 4/2003 | Magro | G06F 11/3409 |
| | | | 702/182 |
| 2014/0355427 A1* | 12/2014 | Cheng | H04L 47/24 |
| | | | 370/230 |
| 2019/0179757 A1* | 6/2019 | Walker | G06F 11/3433 |

FOREIGN PATENT DOCUMENTS

JP   2016503911   * 11/2013   ......... G06F 12/0607

OTHER PUBLICATIONS

Machine Translation of JP2016503911. (Year: 2013).*

(Continued)

*Primary Examiner* — Charles Rones
*Assistant Examiner* — Hewy H Li
(74) *Attorney, Agent, or Firm* — Compass IP Law PC

(57) ABSTRACT

Examples include a computing system for receiving memory class of service parameters; setting performance monitoring configuration parameters, based at least in part on the memory class of service parameters, for use by a performance monitor of a memory controller to generate performance monitoring statistics by monitoring performance of one or more workloads by a plurality of processor cores based at least in part on the performance monitoring configuration parameters; receiving the performance monitoring statistics from the performance monitor; and generating, based at least in part on the performance monitoring statistics, a plurality of memory bandwidth settings to be applied by a memory bandwidth allocator to the plurality of processor cores to dynamically adjust priorities of memory bandwidth allocated for the one or more workloads to be processed by the plurality of processor cores.

25 Claims, 6 Drawing Sheets

(56) References Cited

OTHER PUBLICATIONS

H., Andrew, et al, "Introduction to Memory Bandwidth Allocation", https://software.intel.com/en-us/articles/introduction-to-memory-bandwidth-allocation, published Mar. 12, 2019, downloaded Jan. 28, 2020, 10 pages.

Hiremath, et al., "Telco/Cloud Enablement for 2nd Generation Intel Xeon Scalable platform, Intel Resource Director Technology", Application Note Intel Corporation, https://networkbuilders.intel.com/solutionslibrary/telco-cloud-enablement-for-2nd-generation-intel-xeon-scalable-platform-intel-resource-director-technology#.XI_YuTsZhE, Apr. 2, 2019, 14 pages.

Intel Corporation, "Are Noisy Neighbors in Your Data Center Keeping You up at Night?", https://www.intel.com.tr/content/dam/www/public/us/en/documents/white-papers/intel-rdt-infastructure-paper.pdf, © 2017 Intel Corporation, downloaded Mar. 4, 2020, 45 pages.

Intel Resource Director Technology (Intel RDT), "Unlock System Performance in Dynamic Environments", https://www.intel.com/content/www/us/en/architecture-and-technology/resource-director-technology.html, downloaded Mar. 4, 2020, 7 pages.

\* cited by examiner

400

DYNAMIC CONTROL OF MEMORY BANDWIDTH ALLOCATION FOR A PROCESSOR

CROSS-REFERENCE TO RELATED APPLICATION

This application claims the benefit of U.S. Provisional Application Ser. No. 62/817,927, filed Mar. 13, 2019.

BACKGROUND

The field of invention relates generally to multi-core processor architectures in computing systems, and, more specifically, to dynamic control of memory bandwidth allocation for a multi-core processor.

In modern processor design, a multi-core processor architecture has shared resources such as memory bandwidth, interconnect bandwidth including last-level cache (LLC), processing threads, input/output (I/O) devices, etc. Application performance can become highly unpredictable due to access contention of the shared resources from "noisy neighbor" applications.

Some processors include a technology called Resource Director Technology (RDT), commercially available from Intel Corporation, that enables levels of visibility/control over how shared system resources such as LLC and memory bandwidth are being used by different applications executing on the processor. Low priority applications can be prevented from accessing shared resources if they exceed a quota which is monitored by the RDT technology.

Enabling RDT in a cloud service provider (CSP) computing environment involves complicated implementations in software (SW), including resource monitor/control interface integration and software dynamic control logic/strategy implementation, which slows down the adoption of this feature in a production data center environment. Further, different CSPs have implemented different software frameworks, and each CSP needs to develop their own software to enable RDT. In some cases, CSPs having incompatible kernel versions prevents adoption of RDT

DETAILED DESCRIPTION

Embodiments of the present invention comprise a software framework-independent dynamic resource controller approach to detect contention in a memory pipeline from noisy workloads based on memory controller (MC) performance counters. Embodiments throttle (e.g., delay) low priority memory requests of noisy workloads to protect memory bandwidth needed to ensure quality of service (QoS) requirements of a high priority workload. In some embodiments, this approach is implemented in the firmware of a P-unit of a multi-core processor. In experimental scenarios, the computing system provides approximately 90% to approximately 97% performance levels even in the presence of a noisy neighbor application.

Figure 1:
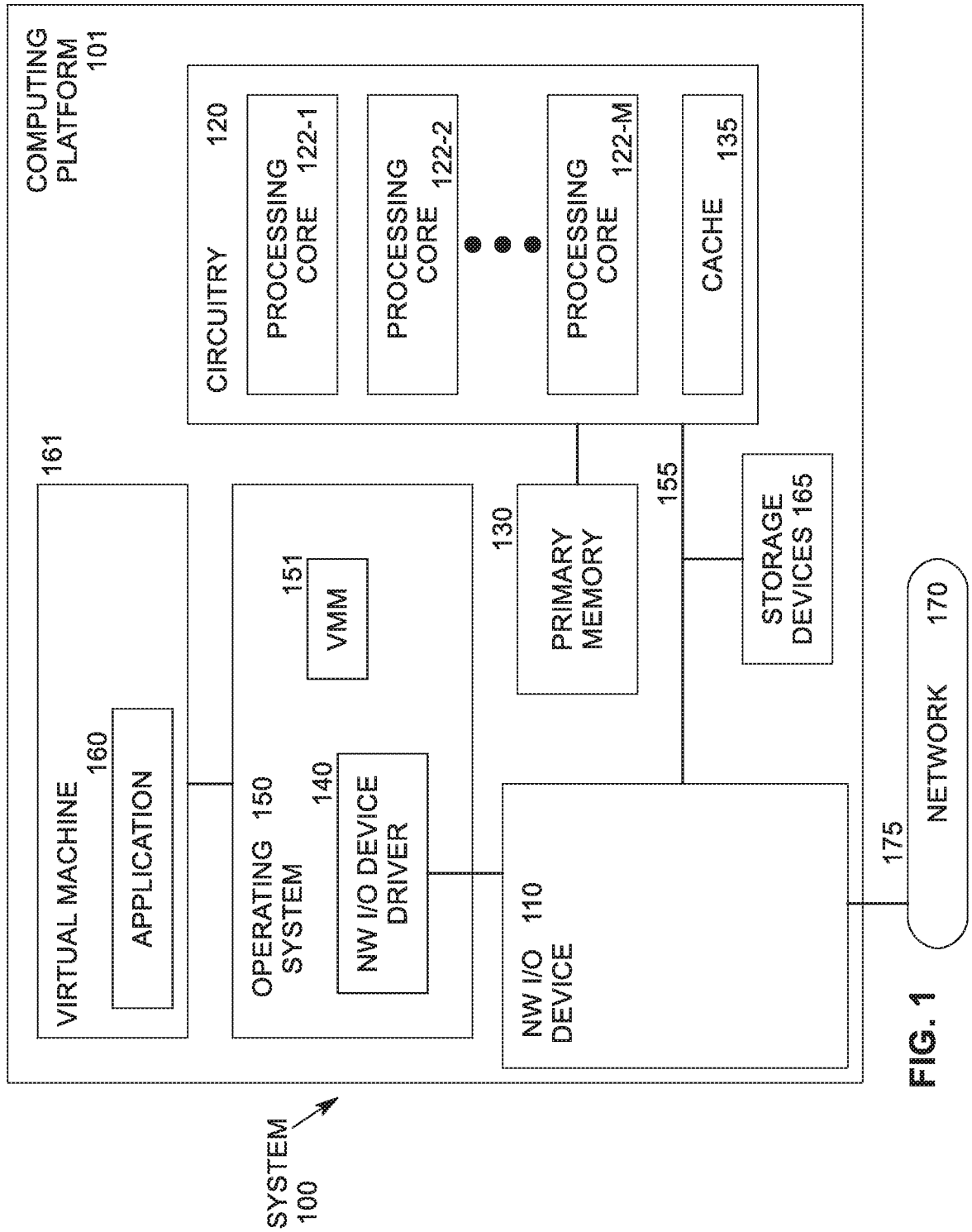
FIG. 1 illustrates an example computing system according to some embodiments.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network (NW) input/output (I/O) device 110. In an embodiment, network I/O device 110 comprises a switch and a network interface controller (NIC) having one or more destination ports (not shown) connected or coupled to network communication channel 175. In an embodiment, network communication channel 175 includes a PHY device (not shown). In an embodiment, network I/O device 110 includes an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, operating system (OS) 150, NW I/O device driver 140, virtual machine manager (VMM) (also known as a hypervisor) 151, at least one application 160 running in a virtual machine (VM) 161, and one or more storage devices 165. In one embodiment, OS 150 is Linux™. In another embodiment, OS 150 is Windows® Server. Other OSs may also be used. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In one embodiment, application 160 is a packet processing application operating in user mode.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-$m$, where "m" is any positive whole integer greater than 1. In one embodiment, only a single processing core is included. In an embodiment, OS 150, VMM 151, NW I/O device driver 140, VM 161 and application 160 are executed by one or more processing cores 122-1 to 122-$m$.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, processors from Applied Micro Devices, Inc., and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAIVI). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAIVI), magneto-resistive random-access memory (MRAIVI) that incorporates memristor technology, spin transfer torque MRAIVI (STT-MRAIVI), or a combination of any of the above. In another embodiment, primary memory 130 may include one or more hard disk drives within and/or accessible by computing platform 101.

Resource Director Technology (RDT), commercially available from Intel Corporation, provides a framework for cache and memory monitoring and allocation capabilities in a processor, including cache monitoring technology (CMT), cache allocation technology (CAT), code and data prioritization (CDP), memory bandwidth monitoring (MBM), and memory bandwidth allocation (MBA). These technologies enable tracking and control of shared resources, such as last-level cache (LLC) and primary memory 130 bandwidth in use by applications 160 and/or VMs 161 running on computing platform 101 concurrently. RDT may aid noisy neighbor detection and help to reduce performance interference, ensuring the performance of key workloads in complex computing environments meets QoS requirements.

Cache Allocation Technology (CAT) provides software-programmable control over the amount of cache space that can be consumed by a given thread, application, virtual machine (VM), or container. This allows, for example, OSs to protect important processes, or hypervisors to prioritize important VMs even in a noisy datacenter environment. The basic mechanisms of CAT include the ability to enumerate the CAT capability and the associated last-level cache (LLC) allocation support via CPUID, and the interfaces for the OS/hypervisor to group applications into classes of service (CLOS) and indicate the amount of last-level cache available to each CLOS. These interfaces are based on Model-Specific Registers (MSRs). As software enabling support is provided, most users can leverage existing software patches and tools to use CAT.

The CMT feature provides visibility into shared platform resource utilization (via L3 cache occupancy), which enables improve application profiling, better scheduling, improved determinism, and improved platform visibility to track down applications which may be over-utilizing shared resources and thus reducing the performance of other co-running applications. CMT exposes cache consumption details, which allows resource orchestration software to ensure better Service Level Agreement (SLA) attainment.

MBA technology enables approximate and indirect control over the memory bandwidth available to workloads, enabling interference mitigation and bandwidth shaping for noisy neighbors present in computing platform 101. MBA provides per-core controls over bandwidth allocation. MBA is included between each core and a shared high-speed interconnect which connects the cores in some multi-core processors. This enables bandwidth downstream of shared resources, such as memory bandwidth, to be controlled. MBA is complementary to existing RDT features such as CAT. For instance, CAT may be used to control the last-level cache, while MBA may be used to control memory bandwidth. The MBA feature extends the shared resource control infrastructure introduced with CAT. The CAT architecture defines a per-software-thread tag called a Class of Service (CLOS), which enables running threads, applications or VMs to be mapped to a particular bandwidth. Through central processing unit (CPU) identifier (CPUID)-based enumeration, the presence of the MBA feature can be confirmed on a specific processor. Once enumerated as present, details such as the number of supported classes of service and MBA feature specifics such as throttling modes supported may be enumerated.

In typical usages an enabled OS 150 or VMM 151 will maintain an association of processing threads to a CLOS. Typically, when a software thread is swapped onto a given logical processor, a model specific register (MSR) such as IA32_PQR_ASSOC MSR (for an Intel Corporation Xeon® processor, for example) is updated to reflect the CLOS of the thread. MBA bandwidth limits per-CLOS are specified as a value in the range of zero to a maximum supported level of throttling for the platform (available via CPUID), typically up to 90% throttling, and typically in 10% steps. These steps are approximate, and represent a calibrated value mapped to a known bandwidth-intense series of applications to provide bandwidth control. The resulting bandwidth for these calibration points provided may vary across system configurations, generations and memory configurations, so the MBA throttling delay values should be regarded as a hint from software to hardware about how much throttling should be applied.

Embodiments of the present invention introduce a practical approach to extend the priority definition of a CLOS in RDT to a new class of service called a memory class of service (called memCLOS herein), and to assign workloads in a processor core to a specific memCLOS, which sets a memory bandwidth priority for each core. Proportional-integral-derivative (PID) controller logic implemented in a P-unit of the processor autonomously detects the saturation of the memory controller (MC) based on MC performance monitoring (perfmon) statistics and proactively applies a delay value to memory bandwidth allocation for a low priority core based on the memCLOS that is attached to that core. In this way, processor firmware preemptively deters memory saturation that can otherwise deteriorate the performance of high priority workloads in a multi-core processor.

Figure 2:
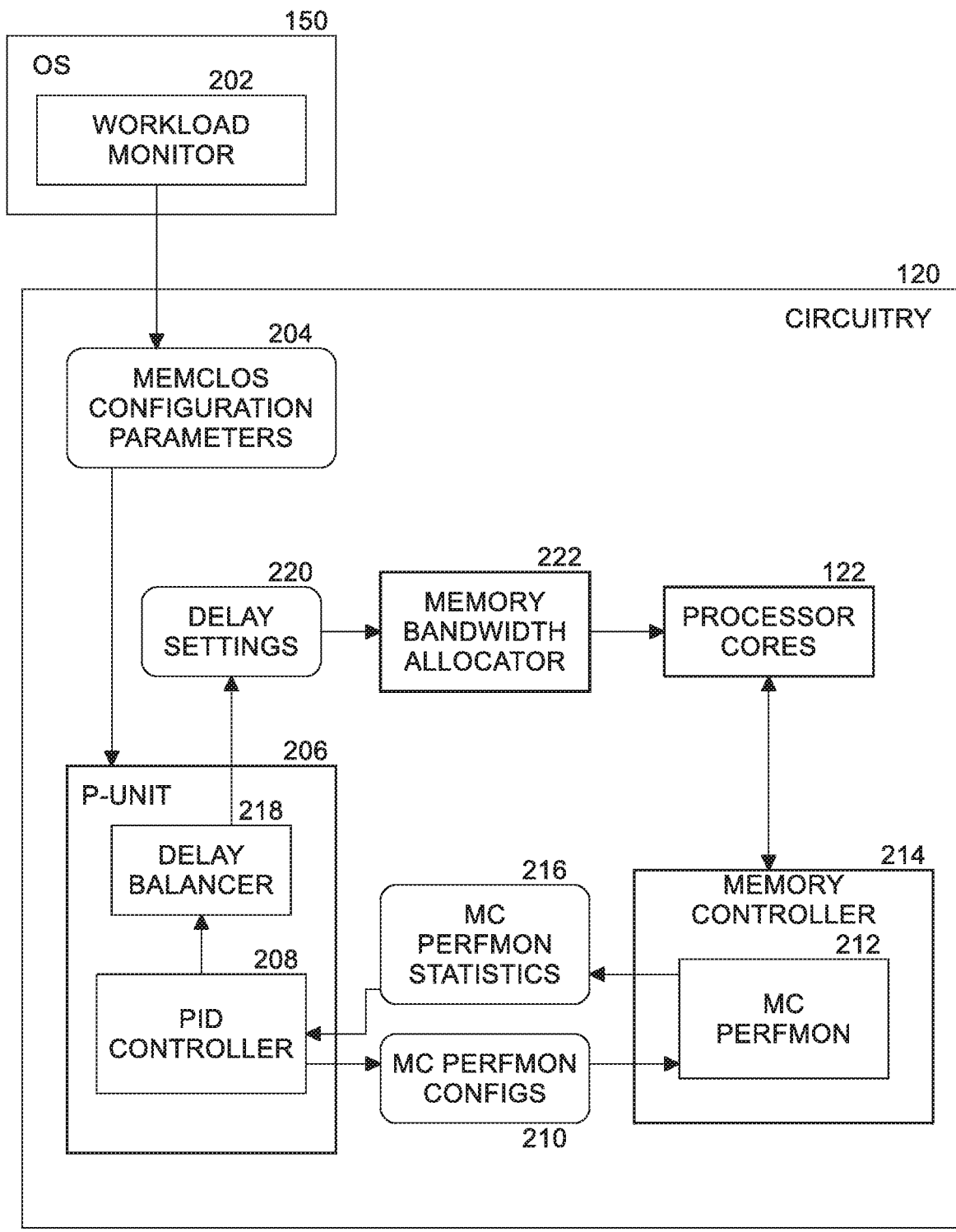
FIG. 2 illustrates an example of dynamic control of memory bandwidth allocation according to some embodiments.

FIG. 2 illustrates an example of dynamic control of memory bandwidth allocation according to some embodiments. Arrangement 200 of components includes workload monitor 202 implemented in software. In one embodiment, workload monitor 202 is a component within OS 150 to monitor workloads (e.g., applications 160 or parts of applications) running on processor cores 122. Computing platform hardware 101 includes processor cores 122 (e.g., one or more instances of cores 122-1 to 122-m), memory controller (MC) 214, P-unit 206, and memory bandwidth allocator (MBA) 222, all part of processor circuitry 120. P-unit 206 uses memCLOS configuration parameters 204 set by workload monitor 202 to determine delay settings 220 (also called memory bandwidth settings), which are passed to MBA 222. MBA 222 communicates with processor cores 122, which are coupled to MC 214. As processor cores process instructions of workloads, MC performance monitor (perfmon) 212 within MC 214 gathers MC perfmon statistics 216 based at least in part on parameters set in MC perfmon configurations (configs) 210. MC perfmon statistics 216 are passed to proportional-integral-derivative (PID) controller 208 within P-unit 206, which may then cause delay balancer 218 to change delay settings 220 as needed. Thus, PID controller 208 and delay balancer 218 implement a control loop mechanism employing feedback that is widely used in applications requiring continuously modulated control. PID controller 208 continuously calculates an error value as the difference between a desired set point (SP) and a measured (e.g., monitored) process variable (PV) (such as RPQ occupancy for example) and applies a correction based on proportional, integral, and derivative terms (denoted P, I, and D respectively). PID controller automatically applies accurate and responsive corrections to a control function (e.g., memory bandwidth allocation in one embodiment).

In embodiments of the present invention, delay balancer 218, based at least in part from inputs from PID controller 208, determines delay settings 220 (e.g., memory bandwidth settings) to be applied by MBA 222 for processor cores 122 to adjust the priorities of memory bandwidth for workloads being processed by the cores.

In one embodiment, memCLOS configuration parameters 204 are communicated from workload monitor 202 to P-unit 206 using a mailbox implementation provided by OS 150. A mailbox may be used for SW/BIOS to communicate with the processor for feature discovery and control. There are two registers which form the mailbox interface: one is the interface register which is used to control and specify the command, and the other is the data register. The busy bit is set and the operation to modify or control is specified. If the operation is a write, the data register carries the write data; and if the operation is a read, the content read back is stored in the data register.

In another embodiment, new MSRs (not shown in FIG. 2) for storing memCLOS configuration parameters 204 are defined and implemented in processor circuitry 120 to extend existing CLOS configurations as defined in RDT.

In some embodiments, memory bandwidth and latency are mapped to one or more configurable metrics. In one embodiment, a specific metric called RPQ_occupancy can be used. A control loop is implemented in P-unit 206 firmware maintaining favorable memory latency characteristics for high priority tasks and detecting unfavorable scenarios where high priority tasks can suffer performance loss due to memory bandwidth/latency degradation by monitoring, for example, system RPQ_occupancy. Delay balancer 218 in P-unit 206 automatically throttles (delays) access to memory bandwidth of low priority CLOS cores when, for example, a system RPQ_occupancy value crosses above a set point and restores high priority memory bandwidth/latency. Delay balancer 218 uses the RDT/MBA interface provided by MBA 222 to achieve throttling of low priority processor cores 122.

In one embodiment, the plurality of delay settings (e.g., memory bandwidth settings) comprises a delay value for memory bandwidth allocation for a low priority processor core based on a memory class of service (memCLOS) of (e.g., assigned to) the low priority processor core. In an embodiment, the one or more of the plurality of delay settings comprises a delay value of zero (e.g., no delay) for memory bandwidth allocation for a high priority processor core based on a memCLOS of (e.g., assigned to) the high priority processor core.

In one embodiment, a PID controller 208 loop in P-unit 206 firmware monitors, for example, RPQ_occupancy of computing platform 101 and when RPQ_occupancy crosses a set point, delay balancer 218 throttles (delays) the low priority processor cores based on their memCLOS definition. In an embodiment, memCLOS configuration parameters 204 can be programmed by workload monitor 202 as shown below in tables 1 and 2, and MC perfmon configs 210 (such as an RPQ_occupancy setpoint) for the system can be programmed as shown below in table 3. In other embodiments, other MC perfmon statistics 216 can be monitored as determining metrics for dynamically adjusting memory bandwidth allocation (or other shared resources).

Thus, a practical design interface to add additional QoS levels for different priority workloads is accomplished in embodiments with the extension to CLOS called memCLOS.

In an embodiment, memCLOS configuration parameters 204 includes a control bit used to enable the memCLOS feature. When set (e.g., set to 1), the memCLOS feature is enabled for computing platform 101. In one embodiment, the enable memCLOS control bit is implemented as a fuse in circuitry 120 that can be blown when the memCLOS capability is authorized.

TABLE 1

Enable memCLOS included in memCLOS configuration parameters 204.

| Name | Description | Bits | Width |
|---|---|---|---|
| MemCLOS_EN | Enables MemCLOS feature for the processor package/die. | 1 | 1 |

In an embodiment, memCLOS configuration parameters 204 include an extension of CLOS IDs that map (e.g., correspond) to memCLOS IDs. There are four different types of memCLOS supported, each type being indicated by an identifier (ID). In one embodiment, there are 16 CLOS and 4 memCLOS. In other embodiments, other numbers of CLOS and memCLOS can be used.

TABLE 2

CLOS to MemCLOS mapping included in
memCLOS configuration parameters 204.

| Field Name | Description | Bits | Width |
|---|---|---|---|
| CLOS0MemCLOS | Mapping of CLOS0 to MemCLOS | 1:0 | 2 |
| CLOS1MemCLOS | Mapping of CLOS1 to MemCLOS | 3:2 | 2 |
| CLOS2MemCLOS | Mapping of CLOS2 to MemCLOS | 5:4 | 2 |
| CLOS3MemCLOS | Mapping of CLOS3 to MemCLOS | 7:6 | 2 |
| CLOS4MemCLOS | Mapping of CLOS4 to MemCLOS | 9:8 | 2 |
| CLOS5MemCLOS | Mapping of CLOS5 to MemCLOS | 11:10 | 2 |
| CLOS6MemCLOS | Mapping of CLOS6 to MemCLOS | 13:12 | 2 |
| CLOS7MemCLOS | Mapping of CLOS7 to MemCLOS | 15:14 | 2 |
| CLOS8MemCLOS | Mapping of CLOS8 to MemCLOS | 17:16 | 2 |
| CLOS9MemCLOS | Mapping of CLOS9 to MemCLOS | 19:18 | 2 |
| CLOS10MemCLOS | Mapping of CLOS10 to MemCLOS | 21:20 | 2 |
| CLOS11MemCLOS | Mapping of CLOS11 to MemCLOS | 23:22 | 2 |
| CLOS12MemCLOS | Mapping of CLOS12 to MemCLOS | 25:24 | 2 |
| CLOS13MemCLOS | Mapping of CLOS13 to MemCLOS | 27:26 | 2 |
| CLOS14MemCLOS | Mapping of CLOS14 to MemCLOS | 29:28 | 2 |
| CLOS15MemCLOS | Mapping of CLOS15 to MemCLOS | 31:30 | 2 |

In one embodiment, MC perfmon configs 210 specify closed loop parameter settings which configure a perfmon event to be monitored by MC perfmon 212 (such as RPQ_occupancy, for example), a set point limit of the event threshold, and a time window, for all memCLOS.

TABLE 3

MC Perfmon Configs 210 fields.

| Field Name | Description | Bits | Width |
|---|---|---|---|
| MemCLOS_Setpoint | MemCLOS set point threshold value. For example, used to set RPQ occupancy set point value (e.g., threshold) or for whatever event is to be monitored. | 7:0 | 8 |
| MemCLOS_Time Window | MemCLOS time window. For example, used to set RPQ occupancy time window or for whatever event is to be monitored. How often to monitor the event (e.g., 1 millisecond (ms), 2 ms, etc.) | 15:8 | 8 |
| MemCLOS_Event | MemCLOS event. Indicates which event will be monitored by MC perfmon 212. | 23:16 | 8 |
| MemCLOS_Event_EN | Enables or disables event monitoring per event. | 24 | 1 |

For multiple events to be monitored, fields memCLOS_Event and memCLOS_Event_EN are repeated for each monitored event. In an embodiment, the time window is set for computing an exponential weighted moving average (EWMA) for MC perfmon statistics 216.

In one embodiment, memCLOS configuration parameters 204 includes four sets of memCLOS attributes as shown below, one per memCLOS, as selected by the memCLOS CLOSID field.

TABLE 4 memCLOS attributes per memCLOS included
in memCLOS configuration parameters 204

| Field Name | Description | Bits | Width |
|---|---|---|---|
| MemCLOS_Priority | Memory priority setting of this memCLOS. 0x0 = highest priority. 0xFF = lowest priority. | 7:0 | 8 |
| MemCLOS_Min | Minimum MBA delay for this memCLOS. | 15:8 | 8 |
| MemCLOS_Max | Maximum MBA delay for this memCLOS | 23:16 | 8 |
| MemCLOS_CLOSID | MemCLOS ID | 25:24 | 2 |

Delay settings 220 as set by delay balancer 218 to specify MBA parameters for use by MBA 222.

Embodiments of the present invention prevent low priority applications from accessing shared resources when a specific threshold in resource usage is reached. In order to achieve this, PID controller 208 monitors MC perfmon statistics 216 and ensures monitored events stay within set limits. PID controller 208 uses a control feedback mechanism which calculates an error value between a specified set point and the MC perfmon statistics, and applies corrections based on proportional, integral and derivative terms. The output of the PID controller is used by delay balancer 218 to set the MBA delay settings 220 (e.g., memory bandwidth settings) for one or more processor cores 122 depending on their priorities, where high priority processor cores get low delay values for their access to memory while low priority processor cores get high delay values.

Figure 3:
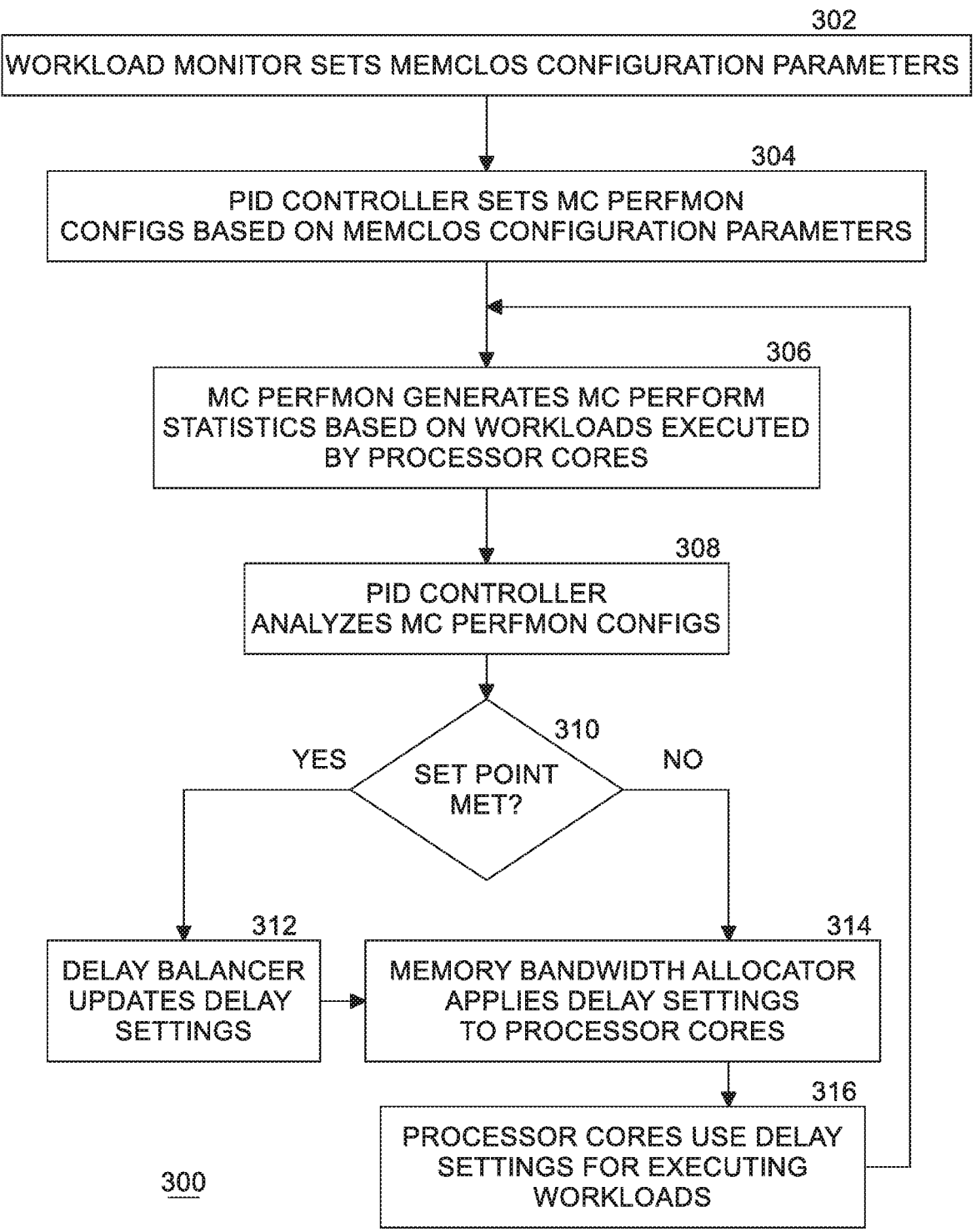
FIG. 3 is a flow diagram illustrating example dynamic control of memory bandwidth allocation processing according to some embodiments.

FIG. 3 is a flow diagram 300 illustrating example dynamic control of memory bandwidth allocation processing according to some embodiments. At block 302, workload monitor 202 sets memCLOS configuration parameters 204 (e.g., enables the memCLOS functionality and sets CLOS to memCLOS mappings). PID controller 208 (implemented in one embodiment as firmware in P-unit 206) is activated when MemCLOS EN is set. At block 304, PID controller 208 sets MC perfmon configs 210 based at least in part on memCLOS configuration parameters 204. In an embodiment, MC perfmon configs 210 are set to enable memory statistics of a desired event, which gives insight into memory bandwidth utilization. At block 306, MC perfmon 212 generates MC perfmon statistics 216 based on workloads executed by processor cores 122. At block 308, PID controller 208 periodically reads MC perfmon statistics 210 generated by MC perfmon 212 and analyzes the MC perfmon statistics. If PID controller 208 determines, based on analysis of the MC perfmon statistics, that a memCLOS set point has been met, then PID controller 208 causes delay balancer 218 to update delay settings 220 at block 312. Delay settings 220 are used to dynamically throttle memory bandwidth of any low priority processing cores when bandwidth contention issues arise. In an embodiment, delay balancer 218 distributes a delay budget amongst the various memCLOS classes based on a priority value for each memCLOS. For example, high priority processing cores can be given less delay (perhaps even a delay value of zero) and low priority processing cores can be given more delay. Otherwise, if the set point has not been met, no update of the delay settings is made. In either case, processing continues with block 314 where memory bandwidth allocator 222 applies delay settings 220 to processor cores. At block 316, processor cores 122 use the delay settings for executing workloads. Processing continues in a closed loop back at block 306 with the gathering of new MC perfmon statistics. In an embodiment, the closed loop is repeated periodically to continuously dynamically adjust memory bandwidth.

Figure 4:
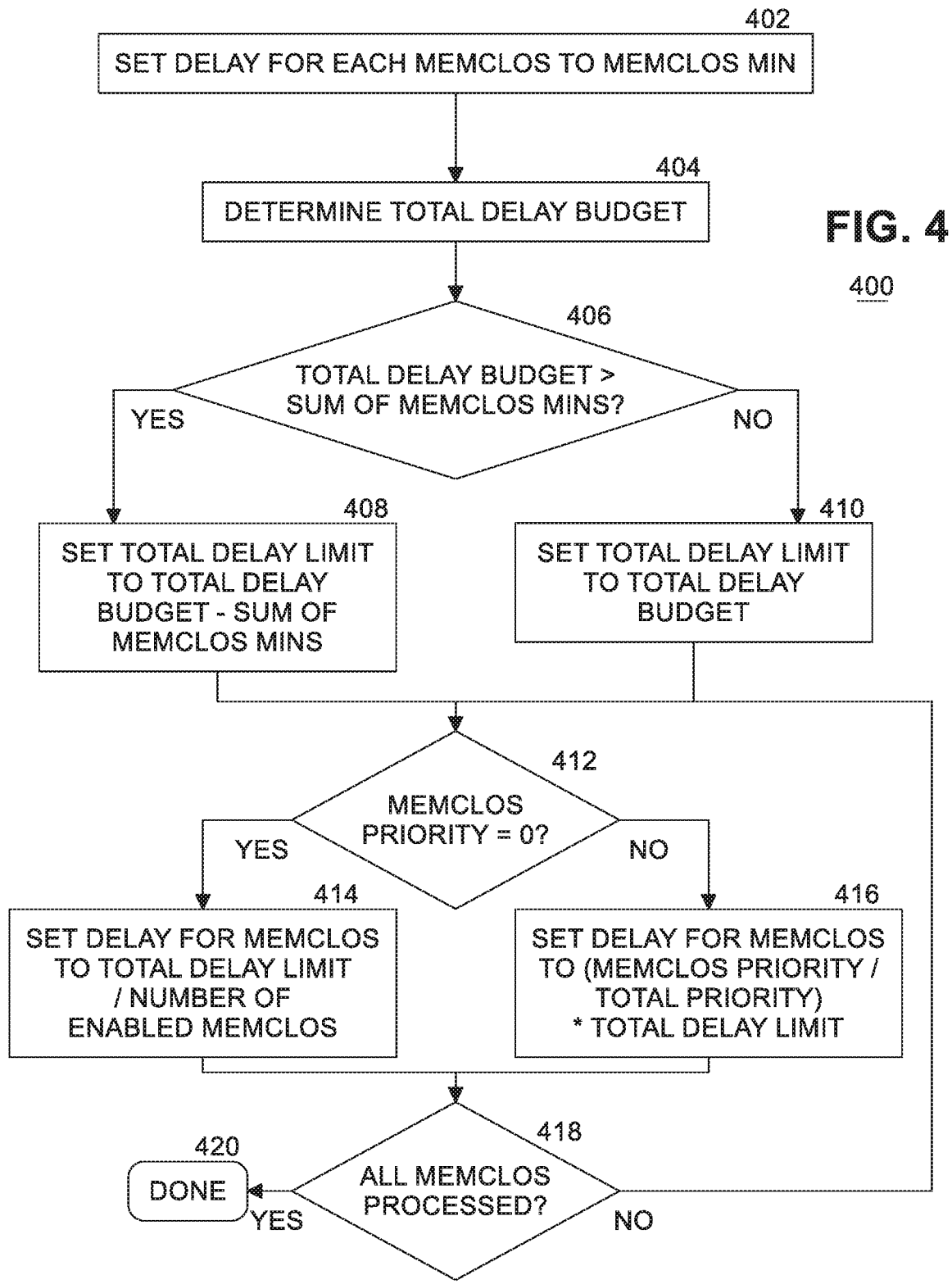
FIG. 4 is a flow diagram illustrating delay balancer processing according to some embodiments.

FIG. 4 is a flow diagram 400 illustrating delay balancer 218 processing according to some embodiments. At block 402, delay balancer 218 sets a delay value for each memCLOS to a minimum memCLOS value. At block 404, delay balancer 218 determines a total delay budget for circuitry 120. In an embodiment, the total delay budget is set to the output of PID controller 208 multiplied by the number of enabled memCLOS. At block 406, if the total delay budget is greater than a sum of the memCLOS minimum values, then at block 408, delay balancer 218 sets a total delay limit to the total delay budget minus the sum of the memCLOS minimum values. Otherwise, delay balancer 218 sets the total delay limit to the total delay budget at block 410. Processing continues with a first memCLOS at block 412. If the priority of this memCLOS is 0 (indicating high priority in one embodiment), then at block 414 delay balancer 218 sets a delay for this memCLOS to the total delay limit divided by the number of enabled memCLOS. If the priority of this memCLOS is not 0 (indicating a lower priority than the highest setting), then at block 416 delay balancer 218 sets the delay for this memCLOS to the priority of this memCLOS divided by the total of all priority values multiplied by the total delay limit. Thus, in one embodiment, setting each of the plurality of delay settings to a delay value is based at least in part on the total delay budget and the priority of the selected memCLOS. Next, at block 418 if not all memCLOS have been processed, then block 412, 414 or 416 are performed for the next memCLOS. If all memCLOS have been processed, delay balancer processing ends at block 420. The updated delay settings 220 are then input to memory bandwidth allocator 222.

With features of embodiments of the present invention enabled, a firmware-based dynamic resource controller (DRC) for memory bandwidth allocation as described herein maintains approximately 90% to 97% of the performance of high priority workloads of search, redis, and specCPU2006 launched along with low priority noisy workloads like stream and specCPU2006. Noisy aggressors such as stream and specCPU workloads can degrade high priority workload performance by approximately 18% to 40% if DRC is not present. With a noisy memory aggressor, and DRC enabled, some embodiments can maintain approximately 90% to 97% of high priority core baseline performance. With embodiments of the present invention, overall processor utilization is improved from approximately 65% to 90% compared with approximately 25% to 45% with high priority cores alone.

Also, comparing to software implemented similar control logic, the firmware-based dynamic resource controller as described herein implemented using existing processor hardware will save up to 90% of a processor core depending on the sampling interval and improve monitor/control and response action convergence in 10 s of milliseconds (ms) granularity. In contrast, a SW controller can only respond within 100 s of ms because of kernel/user space SW overheads.

There are at least several advantages of embodiments of the present invention. The dynamic resource controller as described herein which uses RDT features such as memory bandwidth allocation (MBA) can be easily adopted in different CSP SW frameworks without requiring any changes to their SW frameworks. Embodiments provide a fast response (target 1 millisecond (ms)) through a control mechanism (e.g., P-unit 206) in processor firmware. When bad behavior is detected, processor firmware logic in P-unit 206 throttles bandwidth to lower priority memCLOS through MBA in a closed loop action which will help remove potential performance jitter within a fast interval. The end user will not notice the noisy workload impact because of the fast action. Embodiments of the present invention are autonomous, dynamic, and do not involve any additional hardware overhead. Current RDT solutions are static and can be overly restrictive for cases where throttling is not needed. Embodiments of the present invention provide a dynamic controller that throttles memory bandwidth access only when needed. Measurements show that if the control loop is implemented in SW, the control loop can consume almost a single processor core. Embodiments can save a single virtual central processing unit (vcpu) compute resource by running the control mechanism in the package control unit (PCU) controller.

Figure 5:
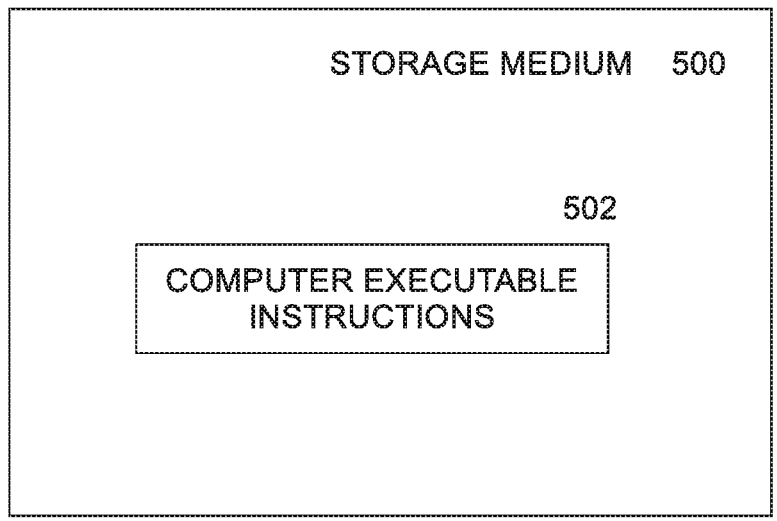
FIG. 5 illustrates an example of a storage medium.

FIG. 5 illustrates an example of a storage medium 500. Storage medium 500 may comprise an article of manufacture. In some examples, storage medium 500 may include any non-transitory computer readable medium or machine readable medium, such as an optical, magnetic or semiconductor storage. Storage medium 500 may store various types of computer executable instructions, such as instructions 502 to implement logic flows described above for workload monitor 202 and/or delay balancer 218. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
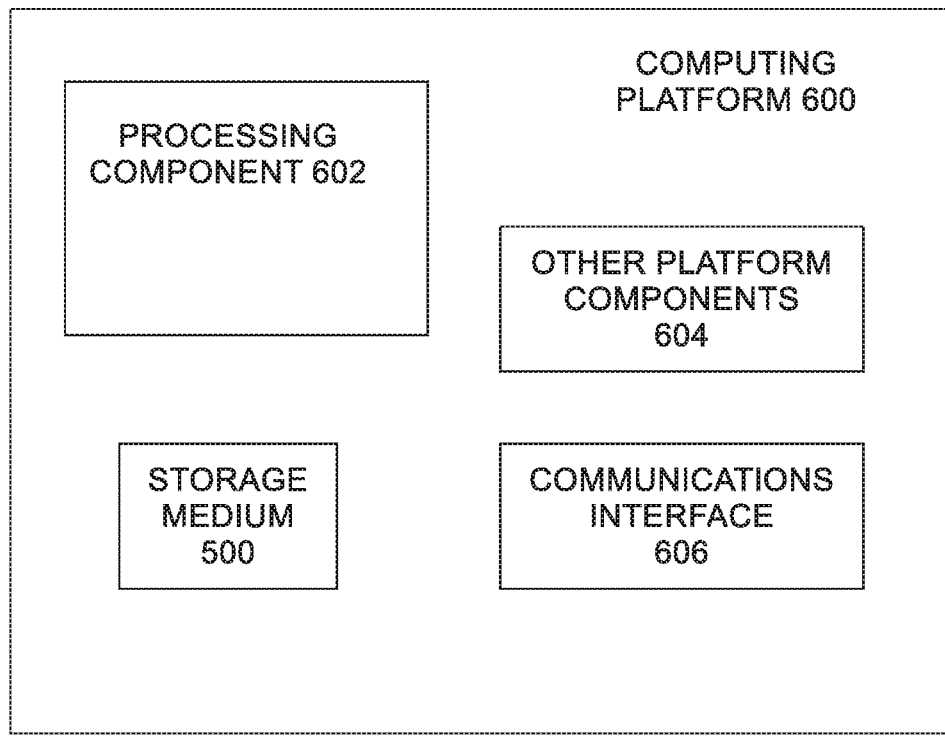
FIG. 6 illustrates an example computing platform.

FIG. 6 illustrates an example computing platform 600. In some examples, as shown in FIG. 6, computing platform 600 may include a processing component 602, other platform components 604 and/or a communications interface 606.

According to some examples, processing component 602 may execute processing operations or logic for instructions stored on storage medium 500. Processing component 602 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 604 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAIVI that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 606 may include logic and/or features to support a communication interface. For these examples, communications interface 606 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 600, including logic represented by the instructions stored on storage medium 600 may be implemented using any combination of discrete circuitry, ASICs, logic gates and/or single chip architectures. Further, the features of computing platform 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a plurality of processor cores;
first circuitry, coupled to the plurality of processor cores, to apply at least one of a plurality of memory bandwidth settings to the plurality of processor cores to dynamically adjust priorities of memory bandwidth allocated for one or more workloads to be processed by the plurality of processor cores;
a memory controller, coupled to the plurality of processor cores, the memory controller including a performance monitor to generate performance monitoring statistics by monitoring performance of the one or more workloads by the plurality of processor cores based at least in part on performance monitoring configuration parameters; and
second circuitry, coupled to the first circuitry and the memory controller, to set the performance monitoring configuration parameters based at least in part on memory class of service parameters, and to set the memory bandwidth settings based at least in part on the performance monitoring statistics received from the performance monitor.

2. The apparatus of claim 1, wherein the second circuitry comprises:
a controller to calculate an error value as a difference between a set point and a process variable of the performance monitoring statistics based on proportional-integral-derivative (PID) control; and
third circuitry to generate the memory bandwidth settings based at least in part on the error value.

3. The apparatus of claim 1, wherein one or more of the plurality of memory bandwidth settings comprises a first value for memory bandwidth allocation for a low priority processor core based on an assigned memory class of service of the low priority processor core.

4. The apparatus of claim 3, wherein one or more of the plurality of memory bandwidth settings comprises a second value for memory bandwidth allocation for a high priority processor core based on an assigned memory class of service of the high priority processor core, the first value being less than the second value.

5. The apparatus of claim 1, wherein a class of service of one of the plurality of processor cores corresponds to one of the memory class of service parameters.

6. The apparatus of claim 2, wherein the performance monitoring configuration parameters comprise the set point, a time window, a plurality of events, and a plurality of enable bits corresponding to the plurality of events.

7. The apparatus of claim 1, wherein the memory class of service parameters comprise a plurality of sets of parameters, and at least one set for a selected memory class of service including one or more of: a priority, a minimum delay value, and maximum delay value, and an identifier of the selected memory class of service.

8. A system comprising:
first circuitry to set memory class of service parameters; and
processor circuitry, the processor circuitry including
a plurality of processor cores;
second circuitry, coupled to the plurality of processor cores, to apply memory bandwidth settings to the plurality of processor cores to dynamically adjust priorities of memory bandwidth allocated for one or more workloads to be processed by the plurality of processor cores;
a memory controller, coupled to the plurality of processor cores, the memory controller including a performance monitor to generate performance monitoring statistics by monitoring performance of the one or more workloads by the plurality of processor cores based at least in part on performance monitoring configuration parameters; and
third circuitry, to set the performance monitoring configuration parameters based at least in part on the memory class of service parameters, and to set the memory bandwidth settings based at least in part on the performance monitoring statistics received from the performance monitor.

9. The system of claim 8, wherein the third circuitry comprises:
a controller to calculate an error value as a difference between a set point and a process variable of the performance monitoring statistics based on proportional-integral-derivative (PID) control; and
fourth circuitry to generate the memory bandwidth settings based at least in part on the error value.

10. The system of claim 8, wherein one or more of the plurality of bandwidth settings comprises a first value for memory bandwidth allocation for a low priority processor core based on an assigned memory class of service of the low priority processor core.

11. The system of claim 10, wherein one or more of the plurality of memory bandwidth settings comprises a second value for memory bandwidth allocation for a high priority processor core based on an assigned memory class of service of the high priority processor core, the first value being less than the second value.

12. The system of claim 8, wherein a class of service of one of the plurality of processor cores corresponds to one of the memory class of service parameters.

13. The system of claim 9, wherein the performance monitoring configuration parameters comprise the set point, a time window, a plurality of events, and a plurality of enable bits corresponding to the plurality of events.

14. The system of claim 8, wherein the memory class of service parameters comprise a plurality of sets of parameters, and at least one set for a selected memory class of service including one or more of: a priority, a minimum delay value, and maximum delay value, and an identifier of the selected memory class of service.

15. A method comprising:
receiving memory class of service parameters;
setting performance monitoring configuration parameters, based at least in part on the memory class of service parameters, for use by a performance monitor of a memory controller to generate performance monitoring statistics by monitoring performance of one or more workloads by a plurality of processor cores based at least in part on the performance monitoring configuration parameters;
receiving the performance monitoring statistics from the performance monitor; and
generating, based at least in part on the performance monitoring statistics, a plurality of memory bandwidth settings to be applied to the plurality of processor cores to dynamically adjust priorities of memory bandwidth allocated for the one or more workloads to be processed by the plurality of processor cores.

16. The method of claim 15, comprising periodically repeating receiving the performance monitoring statistics from the performance monitor and generating the plurality of memory bandwidth settings to be applied to the plurality of processor cores to dynamically adjust priorities of memory bandwidth allocated for the one or more workloads to be processed by the plurality of processor cores.

17. The method of claim 15, wherein generating the plurality of memory bandwidth settings comprises calculating an error value as a difference between a set point and a process variable of the performance monitoring statistics and generating the memory bandwidth settings based at least in part on the error value.

18. The method of claim 15, wherein the performance monitoring configuration parameters comprise a set point, a time window, a plurality of events, and a plurality of enable bits corresponding to the plurality of events.

19. The method of claim 15, wherein the memory class of service parameters comprise a plurality of sets of parameters, and at least one set for a selected memory class of service including one or more of: a priority, a minimum delay value, and maximum delay value, and an identifier of the selected memory class of service.

20. The method of claim 19, wherein generating the plurality of memory bandwidth settings comprises determining a delay budget and setting at least one of the plurality of memory bandwidth settings to a delay value based at least in part on the delay budget and the priority of the selected memory class of service.

21. A method comprising:
receiving memory class of service parameters; and
generating, based at least in part on the memory class of service parameters, a plurality of memory bandwidth settings to be applied to dynamically adjust priorities of memory bandwidth allocated for one or more workloads to be processed by a plurality of processor cores, wherein the generating, based at least in part on the memory class of service parameters, the plurality of memory bandwidth settings comprises determining a delay budget and setting at least one of the plurality of memory bandwidth settings to a delay value based at least in part on the delay budget and a priority of a selected memory class of service.

22. The method of claim 21, wherein the memory class of service parameters comprise a plurality of sets of parameters, and at least one set for the selected memory class of service including one or more of: a priority, a minimum delay value, and maximum delay value, and an identifier of the selected memory class of service.

23. An apparatus comprising:
circuitry to set performance monitoring configuration parameters based at least in part on memory class of service parameters and based on proportional-integral-derivative (PID) control and to calculate an error value as a difference between a set point and a process variable of performance monitoring statistics; and
circuitry to generate memory bandwidth settings, based at least in part on the error value, for use to adjust priorities of memory bandwidth allocated for one or more workloads to be processed by a plurality of processor cores.

24. The apparatus of claim 23, wherein the memory class of service parameters comprise a plurality of sets of parameters, and at least one set for a selected memory class of service including one or more of: a priority, a minimum delay value, and maximum delay value, and an identifier of the selected memory class of service.

25. The apparatus of claim 24, wherein one of the memory bandwidth settings comprises a delay value based at least in part on a delay budget and the priority of the selected memory class of service.

\* \* \* \* \*